United States Patent
Endo et al.

(10) Patent No.: US 9,621,531 B2
(45) Date of Patent: Apr. 11, 2017

(54) AUTHENTICATION DEVICE AND AUTHENTICATION PROGRAM

(71) Applicant: Clarion Co., Ltd., Saitama-shi, Saitama (JP)

(72) Inventors: Hiroyoshi Endo, Kawaguchi (JP); Haruhiko Sawajiri, Atsugi (JP)

(73) Assignee: Clarion Co., Ltd., Saitama-shi (JP)

( * ) Notice: Subject to any disclaimer, the term of this patent is extended or adjusted under 35 U.S.C. 154(b) by 0 days.

(21) Appl. No.: 14/404,517

(22) PCT Filed: Apr. 30, 2013

(86) PCT No.: PCT/JP2013/062631
§ 371 (c)(1),
(2) Date: Nov. 28, 2014

(87) PCT Pub. No.: WO2013/179854
PCT Pub. Date: Dec. 5, 2013

(65) Prior Publication Data
US 2015/0195266 A1  Jul. 9, 2015

(30) Foreign Application Priority Data
May 30, 2012 (JP) ................................. 2012-123282

(51) Int. Cl.
*H04L 29/06* (2006.01)
*G06F 21/44* (2013.01)

(52) U.S. Cl.
CPC .............. *H04L 63/08* (2013.01); *G06F 21/44* (2013.01); *G06F 2221/2137* (2013.01)

(58) Field of Classification Search
CPC ........... H04L 63/08; G06F 21/44; G06F 21/62
See application file for complete search history.

(56) References Cited

U.S. PATENT DOCUMENTS

2005/0005038 A1* 1/2005 Ayukawa .............. G06F 3/0601
710/38
2007/0186106 A1* 8/2007 Ting ...................... H04L 63/104
713/168
(Continued)

FOREIGN PATENT DOCUMENTS

JP  2006-260122 A  9/2006
JP  2008-109454 A  5/2008
(Continued)

OTHER PUBLICATIONS

Schacht et al., Standardized Communication in the Control System of the Experiment WENDELSTEIN 7-X, Nov. 2007, 15th IEEE-NPSS Real-Time Conference, pp. 1-6.*
(Continued)

*Primary Examiner* — Kenneth Chang
(74) *Attorney, Agent, or Firm* — Crowell & Moring LLP

(57) ABSTRACT

It is an object of the present invention to provide a communication technology that is more convenient. A device according to one embodiment of the present invention includes: equipment information creating request receiving means for receiving an equipment information creating request issued by external equipment; date/time obtaining means for obtaining information for identifying a date/time; path display identifier identifying means for identifying a path display identifier that is associated with a request source identifier of a request source of the equipment information creating request received by the equipment information creating request receiving means; and output means for outputting, to the external equipment, in response to the equipment information creating request, at least the path display identifier identified by the path display identifier identifying means and the information for identifying a date/time.

11 Claims, 15 Drawing Sheets

(56) References Cited

U.S. PATENT DOCUMENTS

| | | | |
|---|---|---|---|
| 2008/0104391 A1 | 5/2008 | Fukuta et al. | |
| 2008/0120698 A1* | 5/2008 | Ramia | H04L 63/08 726/4 |
| 2009/0094372 A1* | 4/2009 | Nyang | H04L 63/168 709/229 |
| 2009/0138630 A1* | 5/2009 | Yasuta | G06F 3/061 710/38 |
| 2010/0242096 A1* | 9/2010 | Varadharajan | H04L 63/029 726/4 |
| 2011/0078777 A1 | 3/2011 | Fukuta et al. | |
| 2011/0258682 A1* | 10/2011 | Yin | H04L 63/12 726/3 |
| 2011/0295908 A1* | 12/2011 | To | G06F 21/31 707/803 |
| 2012/0047499 A1 | 2/2012 | Krzystofczyk et al. | |
| 2012/0278515 A1* | 11/2012 | Hsu | G06F 3/0605 710/48 |
| 2013/0111549 A1* | 5/2013 | Sowatskey | H04L 63/0823 726/3 |

FOREIGN PATENT DOCUMENTS

| | | |
|---|---|---|
| JP | 2010-45542 A | 2/2010 |
| JP | 2010-282460 A | 12/2010 |
| WO | WO 2005/119398 A1 | 12/2005 |

OTHER PUBLICATIONS

International Search Report dated Jun. 25, 2013 with English translation (four (4) pages).

Japanese-language Written Opinion (PCT/ISA/237) dated Jun. 25, 2013 (five (5) pages).

European Supplementary Search Report dated Dec. 17, 2015 (eight (8) pages).

* cited by examiner

CLIENT INFORMATION TABLE 511

FIG. 3

VALIDITY PERIOD INFORMATION TABLE 512

| PATH DISPLAY IDENTIFIER (512A) | PATH (512B) | AUTHENTICATION INFORMATION VALIDITY PERIOD (512C) |
|---|---|---|
| MEM | PC | FOUR WEEKS |
| SMT | SMARTPHONE | TWO WEEKS |
| Sun, Mon, Tue, Wed, Thu, Fri, Sat | VEHICLE-MOUNTED DEVICE | ONE MINUTE |

LINK TABLE 200

AUTHENTICATION INFORMATION 450

| AUTHENTICATION VERSION | TERMINAL IDENTIFIER | TIME | ENCRYPTED INFORMATION |
|---|---|---|---|
| N.NN | XXXX | Wed Jun 30 21:49:08 1993 | XXXXX |

FIG. 13

VALIDITY PERIOD INFORMATION TABLE 512'

| PATH DISPLAY IDENTIFIER (512A) | PATH (512B) | ONLINE/ OFFLINE (512D) | AUTHENTICATION INFORMATION VALIDITY PERIOD (512C) |
|---|---|---|---|
| MEM | PC | ONLINE | — |
| MEM | PC | OFFLINE | FOUR WEEKS |
| SMT | SMARTPHONE | ONLINE | ONE MINUTE |
| SMT | SMARTPHONE | OFFLINE | TWO WEEKS |
| Sun, Mon, Tue, Wed, Thu, Fri, Sat | VEHICLE-MOUNTED DEVICE | ONLINE | ONE MINUTE |
| Sun, Mon, Tue, Wed, Thu, Fri, Sat | VEHICLE-MOUNTED DEVICE | OFFLINE | — |

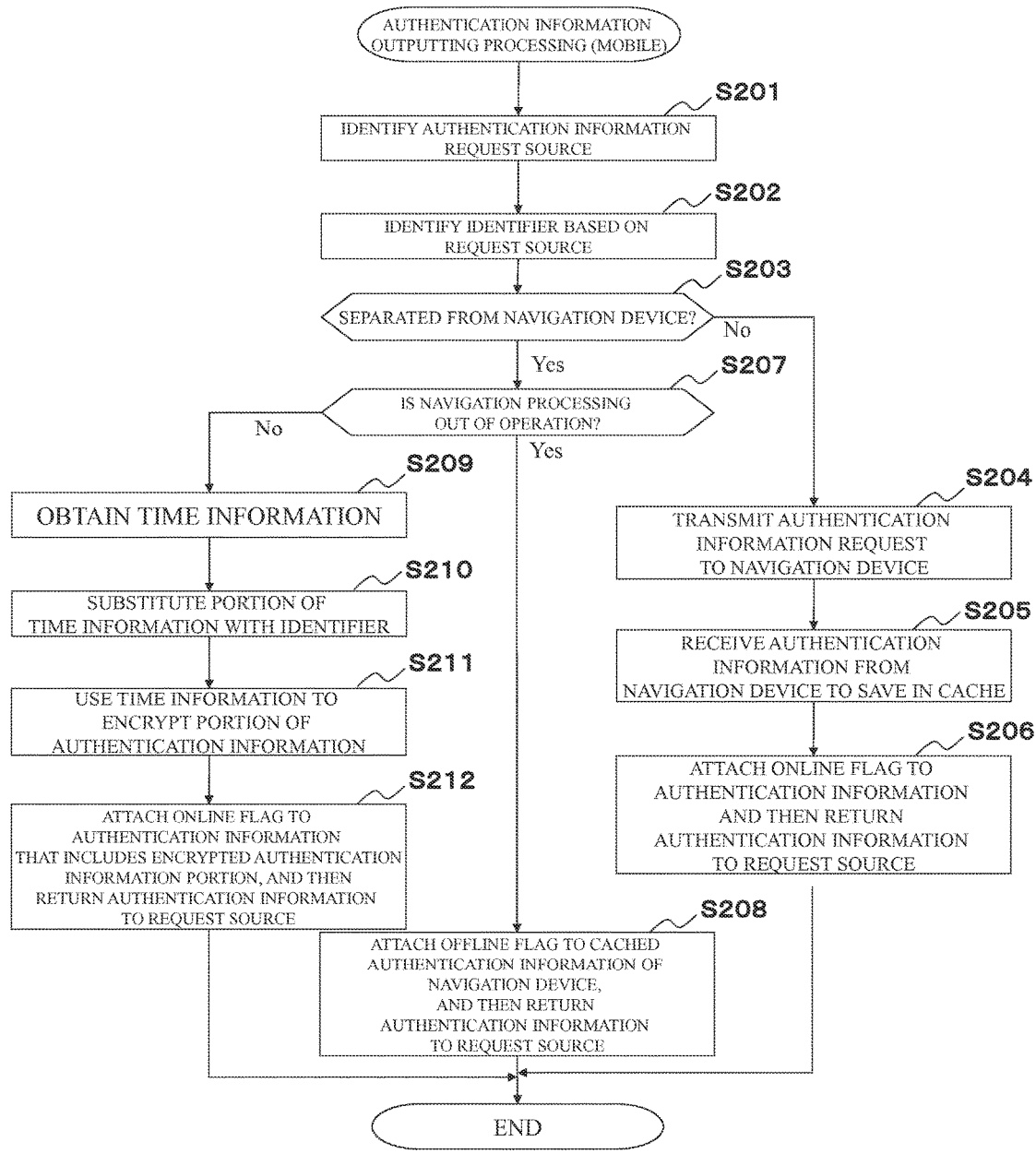

AUTHENTICATION DEVICE AND AUTHENTICATION PROGRAM

TECHNICAL FIELD

The present invention relates to an authentication technology. The present invention claims priority to Japanese Patent Application No. 2012-123282 filed on May 30, 2012, the content of which is incorporated herein in its entirety by reference in designated states where incorporation by reference of literature is allowed.

BACKGROUND ART

Hitherto, there has been a technology that ensures communication by authentication in a device that enables a user to enjoy various digital contents downloaded to a vehicle-mounted telematics device via the Internet through communication on a cellular phone or the like. In Patent Literature 1, there is disclosed a technology about this type of device.

CITATION LIST

Patent Literature

[PTL 1] Japanese Patent Laid-open Publication No. 2006-260122

SUMMARY OF INVENTION

Technical Problem

In the device described above, the communication rate and ultimately communication fee when the communication volume is large vary depending on the means of communication, which results in fluctuations in service level. For instance, when a program update or other types of processing that involves a large communication volume is performed via a cellular phone, a smartphone, or other types of communication means that has a low communication rate, the communication means needs to maintain communication for several hours or several days in some cases, whereas the same processing requires a short communication time when performed via communication means that has a high communication rate such as an optical communication cable. In practice, however, there is an increased risk for identity theft, tampering, and the like, such as the chance for a person who does not actually own the device to obtain an update program.

Solution to Problem

It is an object of the present invention to provide a communication technology that is more convenient.

In order to solve the above-mentioned problem, according to one embodiment of the present invention, there is provided a device, including: equipment information creating request receiving means for receiving an equipment information creating request issued by external equipment; date/time obtaining means for obtaining information for identifying a date/time; request source identifier identifying means for identifying a request source identifier that is associated with a request source of the equipment information creating request received by the equipment information creating request receiving means; and output means for outputting, to the external equipment, in response to the equipment information creating request, at least the request source identifier identified by the request source identifier identifying means and the information for identifying a date/time.

Further, according to one embodiment of the present invention, there is provided a device, including: communication means for holding communication to and from external equipment; storage means for storing a request source identifier based on a type of the external equipment in association with a validity period based on the request source identifier; authentication information receiving means for receiving, via the communication means, from the external equipment, authentication information which includes a request source identifier and date/time information; and validity period determining means for identifying the validity period in the storage means that is associated with the request source identifier obtained from the authentication information that is received by the authentication information receiving means, and, when the date/time information indicates a date/time outside the identified validity period, determining that the authentication information is invalid.

Further, according to one embodiment of the present invention, there is provided a program for causing a computer to execute authentication procedures, the program causing the computer to function as control means, the program causing the control means to execute: an equipment information creating request receiving procedure of receiving an equipment information creating request which is issued by external equipment; a date/time obtaining procedure of obtaining information for identifying a date/time; a request source identifier identifying procedure of identifying a request source identifier that is associated with a request source of the equipment information creating request received in the equipment information creating request receiving procedure; and an output procedure of outputting, to the external equipment, in response to the equipment information creating request, at least the request source identifier identified in the request source identifier identifying procedure and the information for identifying a date/time.

There is provided a program for causing a computer to execute authentication procedures, the program causing the computer to function as control means, communication means for holding communication to and from external equipment, and storage means for storing a request source identifier based on a type of the external equipment in association with a validity period based on the request source identifier, the program causing the control means to execute: an authentication information receiving procedure of receiving, via the communication means, from the external equipment, authentication information which includes a request source identifier and date/time information; and a validity period determining procedure of identifying the validity period in the storage means that is associated with the request source identifier obtained from the authentication information that is received in the authentication information receiving procedure, and, when the date/time information indicates a date/time outside the identified validity period, determining that the authentication information is invalid.

Advantageous Effects of Invention

According to one embodiment of the present invention, it is possible to provide the communication technology that is more convenient.

BRIEF DESCRIPTION OF DRAWINGS

FIG. 3 shows the configuration of a validity period information table.

FIG. 13 shows the configuration of a validity period information table according to a second embodiment of the present invention.

FIG. 14 is a flow chart of authentication information outputting processing (mobile) according to the second embodiment of the present invention.

DESCRIPTION OF EMBODIMENTS

An authentication system to which authentication according to a first embodiment of the present invention is applied is described below with reference to the drawings.

Figure 1:
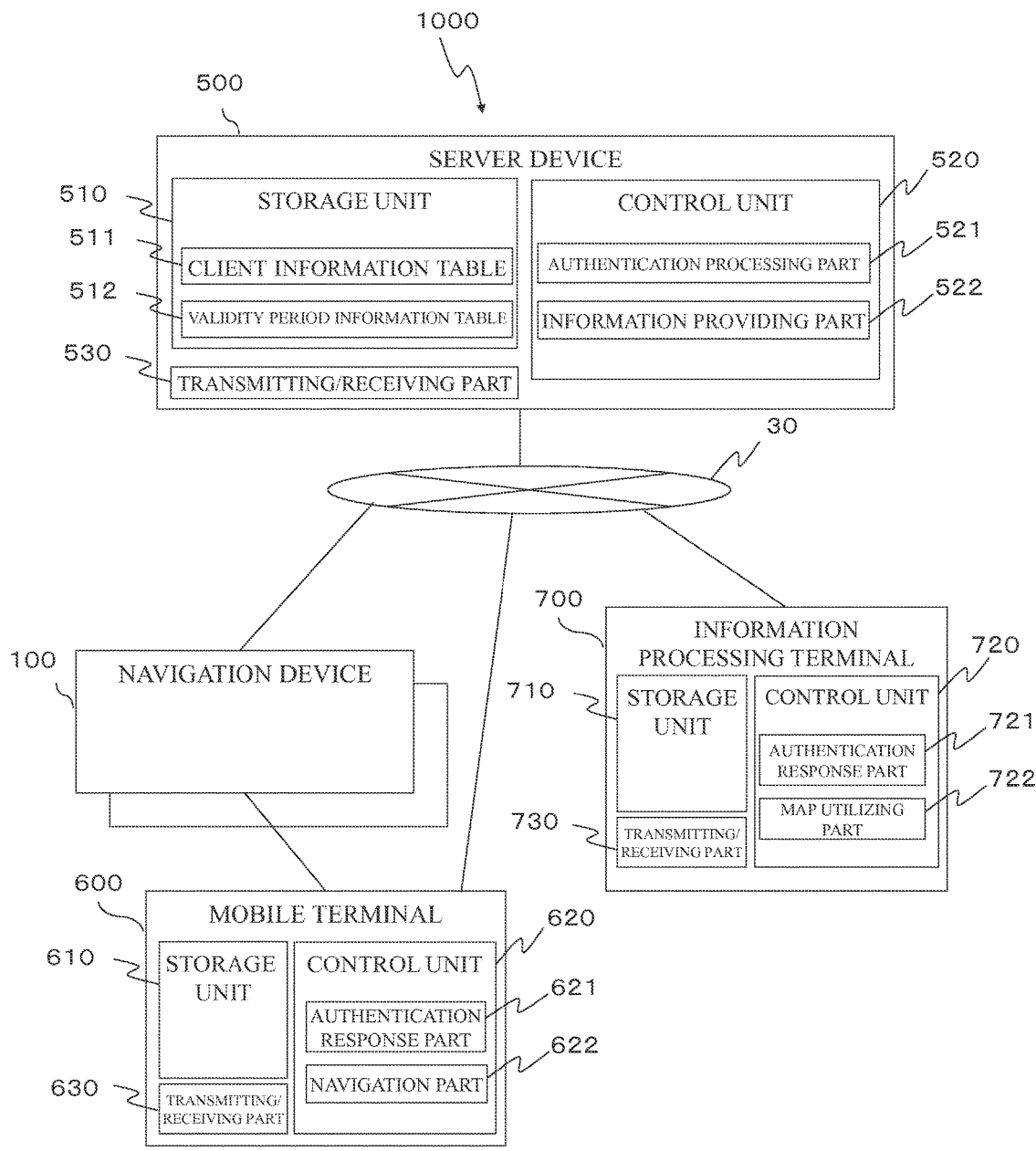
FIG. 1 is a schematic configuration diagram of an authentication system according to a first embodiment of the invention.

FIG. 1 is an overall configuration diagram of an authentication system 1000. The authentication system 1000 includes a server device 500, a navigation device 100, which is connected to the server device 500 via a network 30, a mobile terminal 600, and an information processing terminal 700. The authentication system 1000 may include a plurality of server devices 500, a plurality of navigation devices 100, a plurality of mobile terminals 600, and a plurality of information processing terminals 700, instead of one each. It is also sufficient if the authentication system 1000 includes at least two out of the navigation device 100, the mobile terminal 600, and the information processing terminal 700.

The navigation device 100 is a common navigation device capable of displaying map information, a point that indicates the current location of the navigation device 100, and information that gives navigation on routes to a set destination. However, the navigation device 100 is not limited thereto as described later, and can be all kinds of devices that give navigation on routes for a mobile object, for example, vehicle-mounted devices, cellular phones, personal digital assistants (PDAs), mobile PCs, music players, and all other types of information terminals.

The server device 500 is a device for receiving requests for various types of processing such as a search for a facility and the downloading of an update program from other devices via the network 30, which is the Internet or the like, and returns facility information found as a result of the search or the update program in response. The network 30 can be, for example, a wireless communication network such as a cellular phone network, a cable communication network, a composite of a cable communication network and a wireless communication network, or a closed area network which is not the Internet.

The mobile terminal 600 is a cellular phone terminal or all other types of information terminals whose operation can be controlled by various types of external general-purpose application software, such as smartphones, personal digital assistants (PDAs), mobile PCs, and music players. The mobile terminal 600 and the information processing terminal 700 in general differ from each other in their communication functions which are for data exchange communication where a wireless packet network is mainly used, wireless communication by line switching, communication in conformity with a wireless communication standard such as 802.11x, or other types of communication. However, there is no strict distinction between the mobile terminal 600 and the information processing terminal 700 here, and the two may have the same configuration. The mobile terminal 600 in this embodiment is capable of wireless data communication within a communication range of a given size, and the assumption here is that the mobile terminal 600 is a device that is higher in portability than the information processing terminal 700.

The information processing terminal 700 can be all kinds of information terminals whose operation can be controlled by various types of external general-purpose application software, such as personal computers, desktop PCs, and mobile PCs. The information processing terminal 700 and the mobile terminal 600 in general differ from each other in their communication functions which are for data exchange communication where a packet cable network such as a fiber optic network or an ADSL network is mainly used, communication by line switching, communication in conformity with a wireless communication standard such as 802.11x, or other types of communication. However, there is no strict distinction between the information processing terminal 700 and the mobile terminal 600 here, and the two may have the same configuration. The information processing terminal 700 in this embodiment is capable of wired data communication at a relatively high rate mainly within a given range such as within a house or a business facility, and the assumption here is that the information processing terminal 700 is a device that is higher in processing power than the mobile terminal 600.

As illustrated in FIG. 1, the server device 500 according to this embodiment includes a storage unit 510, a control unit 520, and a transmitting/receiving part 530. The storage unit 510 stores a client information table 511 and a validity period information table 512. The control unit 520 includes an authentication processing part 521 for authenticating the validity of processing requests received from the navigation device 100, the mobile terminal 600, and the information processing terminal 700, which are clients that issue processing requests, and an information providing part 522 for providing information that is relevant to an authenticated processing request. The transmitting/receiving part 530 holds communication over the network 30 to and from other devices, in particular, the navigation device 100, the mobile terminal 600, and the information processing terminal 700.

The client information table 511 and validity period information table 512 stored in the storage unit 510 are data storage areas in the storage unit 510, which is constructed from a storage medium capable of at least read and write, such as a hard disk drive (HDD) or a non-volatile memory card.

Figure 2:
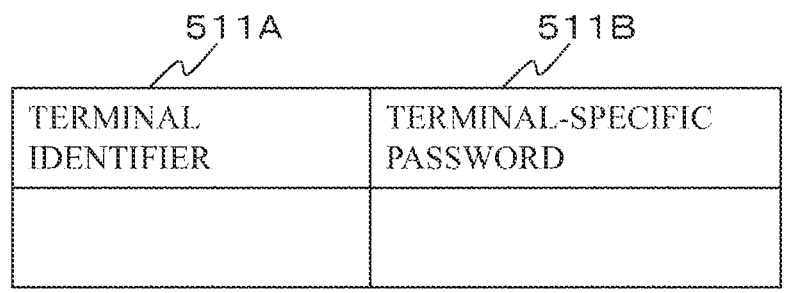
FIG. 2 shows the configuration of a client information table.

As shown in FIG. 2, the client information table 511 is an area that stores an identifier and other types of information necessary to authenticate a client who is making a request for given processing to the server device 500. Specifically, the client information table 511 includes a terminal-specific password 511B which is associated with a terminal identifier 511A. Stored as the terminal identifier 511A is an identifier that is uniquely assigned to the navigation device 100 in advance, such as an individual product number. Stored as the terminal-specific password 511B is a password that is uniquely assigned to the navigation device 100 in advance. The client information table 511, which stores an identifier and a password that are uniquely assigned to the navigation device 100 in advance, may instead store an identifier unique to the mobile terminal 600 and a password unique to a navigation part 622 which is provided in the mobile terminal 600.

As shown in FIG. 3, the validity period information table 512 is an area that stores a path along which a piece of authentication information is transmitted from a client in association with information for identifying the validity period of the piece of authentication information. Specifically, the validity period information table 512 includes a path display identifier 512A, a path 512B, and an authentication information validity period 512C. The path 512B is information for identifying a path (means) through which the server device 500 is accessed, and the path display identifier 512A is an identifier that is a keyword for identifying the path. The authentication information validity period 512C is information for identifying a period from the time of generation of authentication information transmitted from a client to the expiration of the validity of the authentication information.

The authentication processing part 521 receives a request to execute given processing such as a search from the navigation device 100 or other devices via the network 30, and reads authentication information that is attached to the request to perform authentication processing. The authentication processing part 521 sends "authentication failed" in response to the request when the request is authenticated unsuccessfully. When the request is authenticated successfully, the authentication processing part 521 transfers the request to another component of the control unit 520, such as the information providing part 522, so that the requested processing is executed.

The information providing part 522 receives a request to execute given processing such as a search that has been issued from the navigation device 100 or other devices via the network 30 and authenticated by the authentication processing part 521, executes the requested processing, and outputs the result. When the received request is a facility search request, for example, the information providing part 522 searches for facilities and outputs the result of the search. When the received request is an update program downloading request, the information providing part 522 transmits the requested update program.

The transmitting/receiving part 530 holds communication to and from other devices over the network 30. Specifically, the transmitting/receiving part 530 receives a search request from another device and returns a search result to the device.

Figure 4:
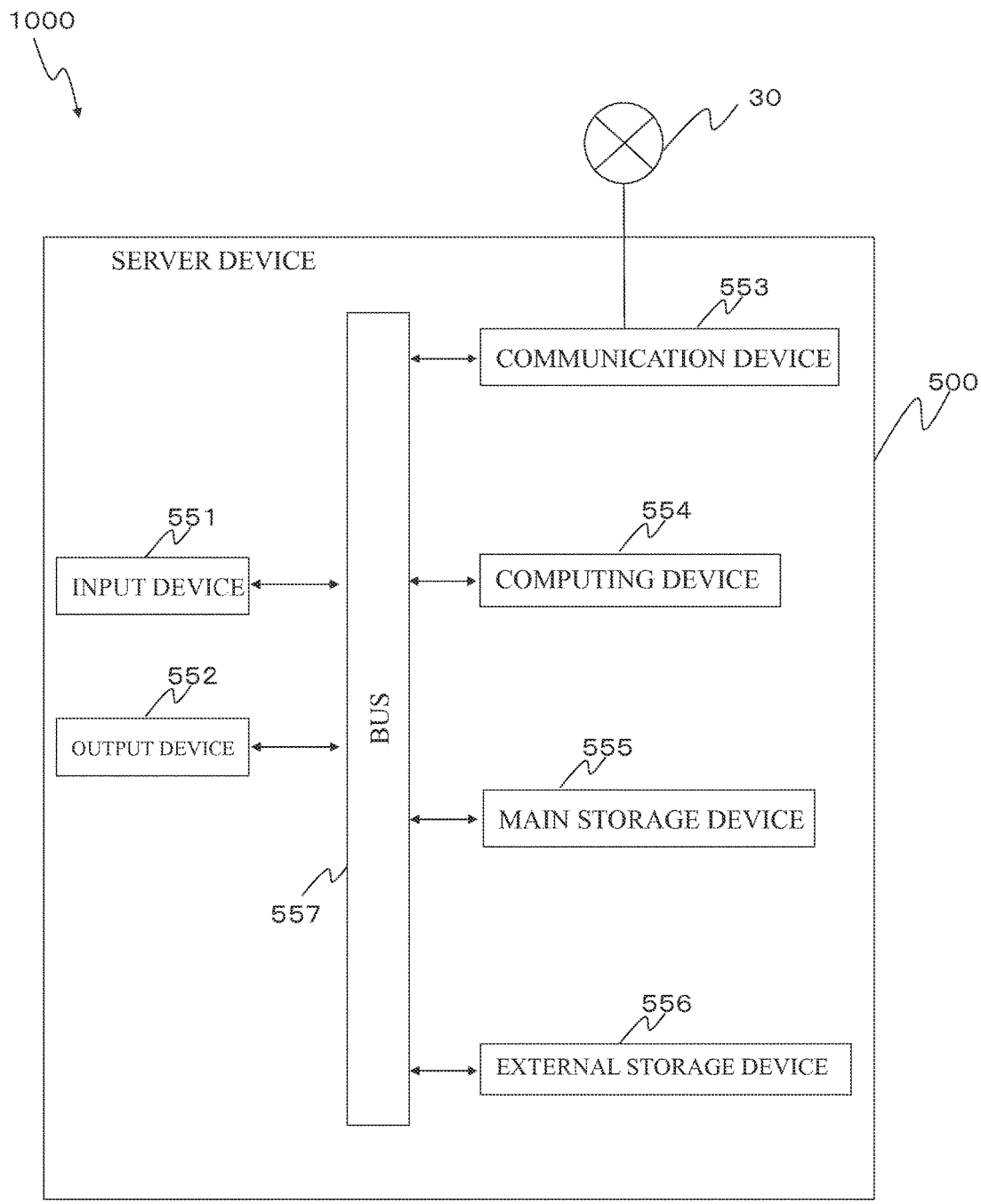
FIG. 4 is a diagram illustrating a hardware configuration example of a server device.

FIG. 4 is a diagram illustrating a hardware configuration example of the server device 500. The server device 500 includes an input device 551, an output device 552, a communication device 553, a computing device 554, a main storage device 555, and an external storage device 556, which are connected to one another by a bus 557. The input device 551 and the output device 552 are not indispensable components, and may be provided if necessary.

The input device 551 is a device for receiving an input, such as a keyboard and/or a mouse, a touch pen, or other pointing devices. The output device 552 is a device for displaying information, such as a display. The communication device 553 is a device for holding communication to and from other devices over the network 30 or other networks. The communication device 553 of the server device 500 can hold communication to and from a communication device 12 of the navigation device 100 and others over the network 30. The computing device 554 is a computing device such as a central processing unit (CPU). The main storage device 555 is a memory device such as a random access memory (RAM). The external storage device 556 is a non-volatile storage device such as a hard disk drive or a solid state drive (SSD).

A command code deployed on the main storage device 555 may be stored in the external storage device 556, or may be obtained from another device in the network 30 (not shown) or from a device in the Internet or other networks. The main storage device 555 has an area in which a command code executed by the computing device 554 is deployed. The external storage device 556 is a normal storage device and stores, in advance, software for running the server device 500, an initial value of data necessary to the software, and other types of data.

The authentication processing part 521 and the information providing part 522 in the control unit 520 of the server device 500 that are described above are built by the computing device 554 by reading and executing a given program. The main storage device 555 therefore stores a program for implementing processing procedures of the respective function parts.

The components of the server device 500 that are described above are classified by the specifics of their main processing procedures for easier understanding of the configuration of the server device 500. Accordingly, the invention of this application is not limited by how components are classified or what the components are named. The configuration of the server device 500 may be classified into more components by the specifics of processing. The configuration of the server device 500 may also be classified so that one component executes more processing procedures.

The control unit 520 of the server device 500 may be built from hardware (an ASIC, a GPU, or the like). Processing procedures of the respective function parts may be executed by a single piece of hardware or a plurality of pieces of hardware.

Figure 5:
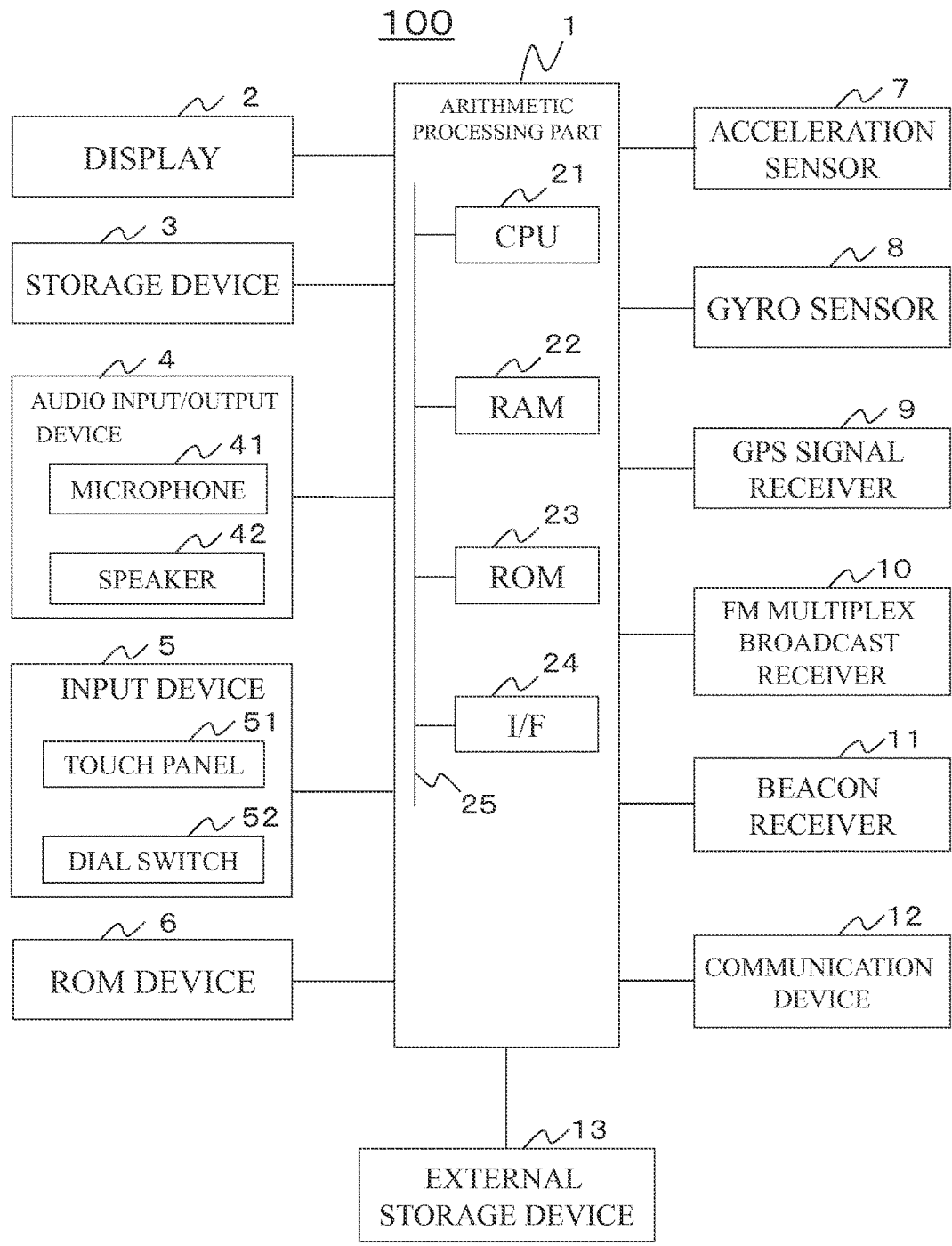
FIG. 5 is a schematic configuration diagram of a navigation device.

FIG. 5 is an overall configuration diagram of the navigation device 100. The navigation device 100 is a common navigation device capable of displaying map information, a point that indicates the current location of the navigation device 100, and information that gives navigation on routes to a set destination.

The navigation device 100 includes an arithmetic processing part 1, a display 2, a storage device 3, an audio input/output device 4 (which has a microphone 41 as an audio input device and a speaker 42 as an audio output device), an input device 5, a ROM device 6, a vehicle speed sensor 7, a gyro sensor 8, a Global Positioning System (GPS) signal receiver 9, an FM multiplex broadcast receiver 10, a beacon receiver 11, the communication device 12 for holding communication to and from another device that connects to the Internet or a cellular phone network, and an external storage device 13, which is detachable.

The arithmetic processing part 1 is a central unit for performing various types of processing. For instance, the arithmetic processing part 1 calculates the current location based on information output from the respective sensors 7 and 8, the GPS signal receiver 9, the FM multiplex broadcast receiver 10, and others. The arithmetic processing part 1 also reads map data that is necessary to display the obtained current location information out of the storage device 3 or the ROM device 6.

The arithmetic processing part 1 deploys the read map data into graphics, superimposes a mark that indicates the current location on the map, and displays the resultant image on the display 2. The arithmetic processing part 1 also uses map data and other types of data stored in the storage device 3 or the ROM device 6 to search for a recommended route, which is the optimum route that connects a departure site specified by a user, or the current location, and a destination (or a place on the way or a stopover). The arithmetic processing part 1 uses the speaker 42 and the display 2 to navigate the user.

A bus 25 connects component devices of the arithmetic processing part 1 of the navigation device 100 to one another. The arithmetic processing part 1 includes a CPU 21 for executing various types of processing such as numerical calculation and control of the component devices, a RAM 22 for storing map data read out of the storage device 3, calculation data, and the like, a ROM 23 for storing programs and data, and an interface (I/F) 24 for connecting various types of hardware to the arithmetic processing part 1.

The display 2 is a unit for displaying graphics information generated by the arithmetic processing part 1 or other devices. The display 2 is constructed from a liquid crystal display, an organic EL display, or the like.

The storage device 3 is constructed from a storage medium capable of at least read and write, such as an HDD or a non-volatile memory card.

This storage medium stores a link table 200, which is map data necessary for a normal route search device (including link data of links that constitute roads on a map), an equipment information table 300, which is equipment-specific information of the navigation device 100, and a path identification information table 400, which is identification information depending on the communication path (communication means).

Figure 6:
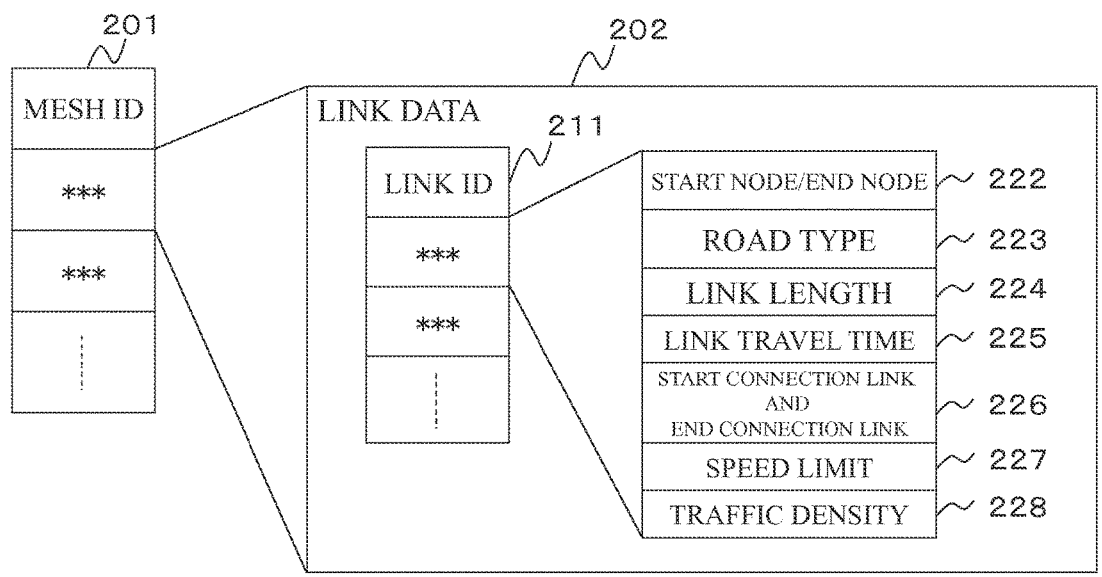
FIG. 6 shows the configuration of a link table.

FIG. 6 shows the configuration of the link table 200. The link table 200 includes, for each identification code of a mesh which is a partition area on a map (mesh ID 201), link data 202 of links that constitute roads included in the mesh area.

The link data 202 includes, for each link ID 211 which is the identifier of a link, coordinate information 222 of two nodes (a start node and an end node) that constitute the link, a road type 223, which indicates the type of a road that includes the link, a link length 224, which indicates the length of the link, a link travel time 225, which is stored in advance, a start connection link and end connection link 226, a speed limit 227, which indicates the speed limit on the road that includes the link, a traffic density 228, which indicates whether the traffic is heavy or light, and other types of data. The start connection link and end connection link 226 is information for identifying a start connection link, which is a link connecting to the start node of the link in question, and an end connection link, which is a link connecting to the end node of the link.

The upstream direction and downstream direction of the same road are managed here as separate links by distinguishing two nodes that constitute a link from each other as a start node and an end node. However, the present invention is not limited thereto. For instance, two nodes that constitute a link may not be distinguished from each other as a start node and an end node.

Figure 7:
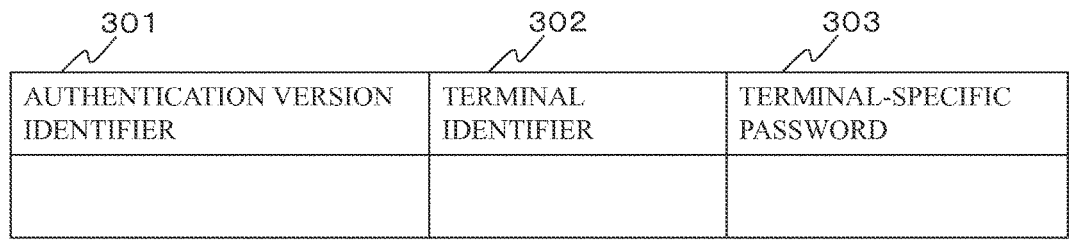
FIG. 7 shows the configuration of an equipment information table.

FIG. 7 shows the configuration of the equipment information table 300. The equipment information table 300 includes information that associates, with one another, an authentication version identifier 301 for identifying an authentication version, a terminal identifier 302 for identifying a terminal, and a terminal-specific password 303, which is a predetermined password unique to the navigation device 100. The information of the terminal identifier 302 and the terminal-specific password 303 corresponds to one of combinations of the terminal identifier 511A and the terminal-specific password 511B stored in the client information table 511 of the server device 500 which is described above.

Figure 8:
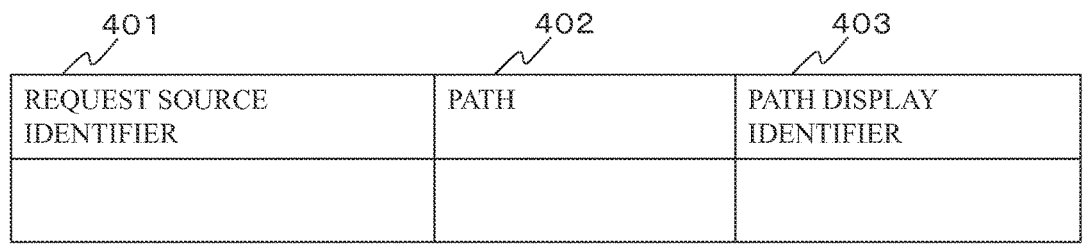
FIG. 8 shows a configuration example of a path identification information table.

FIG. 8 shows the configuration of the path identification information table 400. The path identification information table 400 includes information that associates, with one another, a request source identifier 401, which is received from an authentication request source, a path 402, and a path display identifier 403. The path 402 is information for identifying a path (means) through which the server device 500 is accessed, and the request source identifier 401 is an identifier that serves as a key for identifying the path. The path display identifier 403 is an identifier that is included in authentication information depending on the path.

Referring back to FIG. 5, the audio input/output device 4 has the microphone 41 as the audio input device and the speaker 42 as the audio output device. The microphone 41 collects audio outside the navigation device 100, such as a voice uttered by the user or other passengers.

The speaker 42 outputs in audio a message to the user which is generated by the arithmetic processing part 1. The microphone 41 and the speaker 42 are separately arranged in given places in the interior of a vehicle. The microphone 41 and the speaker 42 may instead be housed in a unitary casing. The navigation device 100 may have a plurality of microphones 41 and a plurality of speakers 42.

The input device 5 is a device for receiving an instruction issued from the user via the user's operation. The input device 5 includes, among others, a touch panel 51, a dial switch 52, and a scroll key and a scale changing key which are other hard switches (not shown). The input device 5 also includes a remote controller capable of remotely issuing an operation instruction to the navigation device 100. The remote controller includes a dial switch, a scroll key, a scale changing key, and the like, and can send information indicating the fact that the keys and the switch have been operated in some combination or alone to the navigation device 100.

The touch panel 51 is mounted on the display surface side of the display 2, and a display screen can be seen through the touch panel 51. The touch panel 51 identifies a touch point in an image displayed on the display 2 which corresponds to X-Y coordinates, converts the touch point into coordinates, and outputs the coordinates. The touch panel 51 is constructed from pressure-sensitive or capacitive input detection elements or the like. The touch panel 51 can be a multi-touch type which is capable of detecting a plurality of touch points simultaneously. However, effects of the invention of this application in terms of cost saving are more prominent on a single touch-type touch panel which detects one touch point at a time and which is inexpensive.

The dial switch 52 is configured so as to be rotatable clockwise and counterclockwise, generates a pulse signal for each rotation by a given angle, and outputs the pulse signal to the arithmetic processing part 1. The arithmetic processing part 1 calculates the rotation angle from the count of pulse signals.

The ROM device 6 is constructed from a storage medium capable of at least read and write, such as a CD-ROM, a DVD-ROM, or other ROMs, or an integrated circuit (IC) card. This storage medium stores moving image data, audio data, and the like.

The vehicle speed sensor 7, the gyro sensor 8, and the GPS signal receiver 9 are used by the navigation device 100 to detect the current location (for example, the location of its own vehicle). The vehicle speed sensor 7 is a sensor for outputting a value used to calculate the vehicle speed. The gyro sensor 8 is constructed from an optical fiber gyroscope, a vibrating gyroscope, or the like, and detects the angular speed of the rotation of a mobile object. The GPS signal receiver 9 receives a signal from a GPS satellite, and performs a measurement of the distance between a mobile object and the GPS satellite and the rate of change in the distance for three or more GPS satellites, there by measuring the current location, traveling speed, and traveling direction of the mobile object.

The FM multiplex broadcast receiver 10 receives FM multiplex broadcast signals sent from FM stations. FM multiplex broadcasts include current traffic outline information, traffic regulation information, service area/parking area (SA/PA) information, parking information, weather information, and the like of Vehicle Information Communication System (VICS, trademark) information, and text information provided by radio stations as FM multiplex general information.

The beacon receiver 11 receives current traffic outline information, traffic regulation information, service area/parking area (SA/PA) information, parking information, weather information, emergency alert information, and the like of VICS information or other sources. The beacon receiver 11 is, for example, a device for receiving an optical beacon which is communicated by light or a radio beacon which is communicated by radio waves.

The communication device 12 connects to a wireless communication network over which the communication device 12 can hold communication to and from a device connected to the network 30. The communication device 12 is a device that connects to, for example, a cellular phone network to hold data communication to and from the server device 500, and this definition includes a device that gains the ability to communicate when the user's cellular phone, for example, is mounted thereto. The communication device 12 can be connected to the user's cellular phone by one of existing general-purpose connection methods, including wired connection methods such as Universal Serial Bus (USB, trademark) and High-Definition Multimedia Interface (HDMI, trademark) and wireless connection methods such as Bluetooth (trademark) and WiFi (trademark), or by a special connection method.

The external storage device 13 is a storage device detachable from the navigation device 100, for example, a device for controlling input to and output from an electronic storage medium such as a non-volatile memory card.

Figure 10:
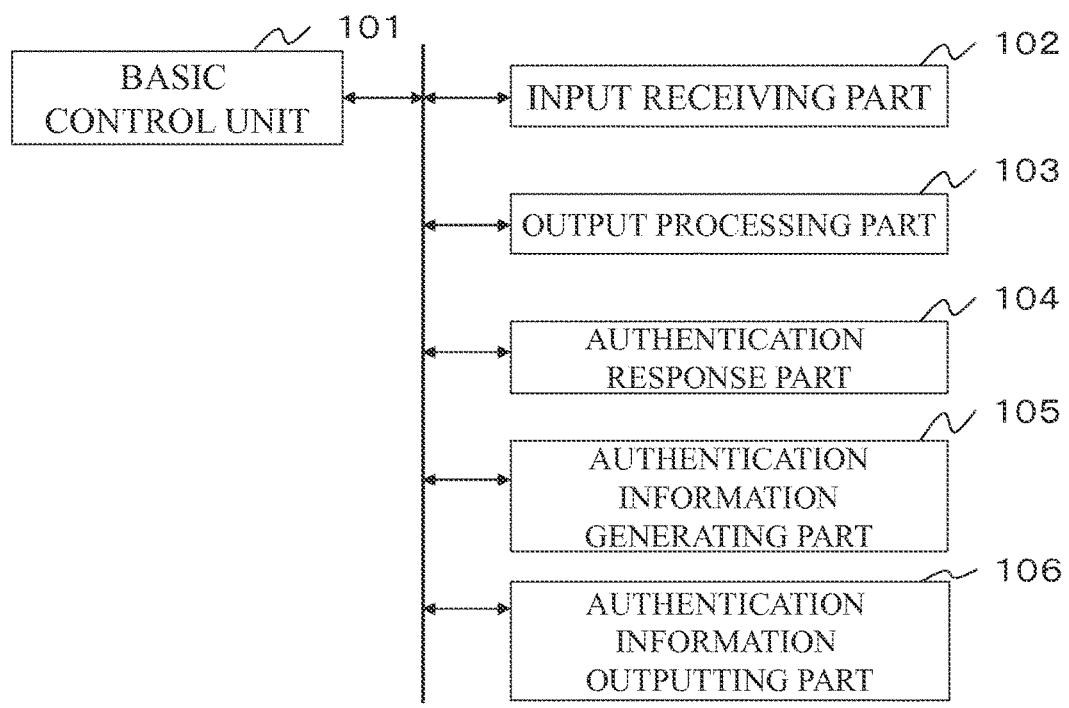
FIG. 10 is a function configuration diagram of an arithmetic processing part of the navigation device.

FIG. 10 is a function block diagram of the arithmetic processing part 1. As illustrated in FIG. 10, the arithmetic processing part 1 includes a basic control unit 101, an input receiving part 102, an output processing part 103, an authentication response part 104, an authentication information generating part 105, and an authentication information outputting part 106.

The basic control unit 101 is a central function part for executing various types of processing, and controls other processing parts in accordance with the specifics of the processing. The basic control unit 101 obtains information from the respective sensors, the GPS signal receiver 9, and other sources to identify the current location by map matching or other types of processing. The basic control unit 101 also stores, for each link, a drive history by associating the date and time of a drive with locations in the storage device 3 as needed. The basic control unit 101 further outputs the current time in response to a request from another processing part.

The basic control unit 101 searches for an optimum route (recommended route) that connects the current location and a destination. In the route search, the basic control unit 101 uses route search logic such as Dijkstra's algorithm to search for a route that requires the minimum link cost based on a link cost which is set in advance to a given section (link) of a road.

The basic control unit 101 navigates the user with the use of the speaker 42 and the display 2 while displaying the recommended route to prevent a deviation of the current location from the recommended route.

The input receiving part 102 receives an input instruction which is input from a user via the input device 5 or the microphone 41, and delivers the input instruction to the basic control unit 101, along with the position in coordinates of the touch or audio information that is information about the input instruction, so that processing corresponding to what is requested is executed. In the case where the user requests a search for a recommended route, for example, the input receiving part 102 issues an instruction regarding the request to the basic control unit 101.

The output processing part 103 receives screen information to be displayed, for example, polygon information, converts the information into signals for drawing an image on the display 2, and instructs the display 2 to draw an image.

The authentication response part 104 receives a request to present authentication information. Receiving an authentication information presenting request, the authentication response part 104 hands over control to the authentication information generating part 105 in order to generate authentication information that is requested by the authentication information presenting request. The authentication response part 104 hands over information for identifying a given request source that is included in the authentication information presenting request, for example, a request source identifying information attached to the request, to the authentication information generating part 105.

The authentication information generating part 105 takes over control from the authentication response part 104, generates authentication information 450 based on the request source identifying information, and hands over the authentication information 450 to the authentication information outputting part 106. The authentication information 450 has, for example, a configuration shown in FIG. 9.

Figure 9:
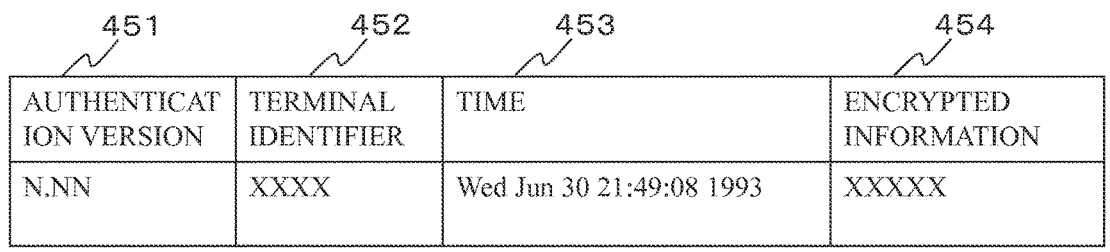
FIG. 9 shows a configuration example of authentication information.

FIG. 9 shows a configuration example of authentication information. The authentication information 450 includes information that associates, with one another, an authentication version 451 for identifying an authentication version, a terminal identifier 452 for identifying a terminal, a time 453 for identifying the time of generation of the authentication information, and encrypted information 454. The encrypted information 454 is created by encrypting, with the use of a given algorithm such as a hash algorithm, information that includes a terminal-specific password which is a password uniquely set to the navigation device 100 in advance and information included in the time 453.

Information stored as the time 453 is a letter string for identifying the date and time. However, a letter string portion that indicates the day of the week is not limited thereto, and a path display identifier associated with the request source may be stored. Specifically, of the information stored as the time 453, information that indicates the day of the week, "Sun", "Mon", "Tue", "Wed", "Thu", "Fri", and "Sat", can be replaced by other letter strings for identifying a given date/time, and may instead be information that includes a path display identifier which is an identifier for identifying a connecting path. The path display identifier is an identifier that indicates a path identified based on authentication source identifying information. Specifically, when the authentication request source is an application program on the navigation device 100, the information that indicates the day of the week out of the information stored as the time 453 directly indicates the day of the week, and "Sun", "Mon", "Tue", "Wed", "Thu", "Fri", and "Sat" are used. When the authentication request source is an application program for the information processing terminal 700, "MEM" is the information that indicates the day of the week out of the information stored as the time 453.

The authentication information 450 in this embodiment is handled in a cookie format to be transmitted to and received from the server device 500 and other devices. However, the authentication information 450 is not limited to one that is handled in a cookie format and can be those handled in other formats such as a parameter as long as the corresponding information is successfully delivered to the server device 500.

The authentication information outputting part 106 receives authentication information generated by the authentication information generating part 105 and outputs the authentication information to the authentication request source. Specifically, when the authentication request source is an application program on the navigation device 100, the authentication information outputting part 106 transmits the authentication information to the server device 500. When the authentication request source is a given request source such as a surrogate connection program of the mobile terminal 600 which carries out the operation of connecting to the server device 500 for the navigation device 100, the authentication information outputting part 106 hands over the authentication information to the surrogate connection program of the mobile terminal 600. When the authentication request source is an application program for the information processing terminal 700, the authentication information outputting part 106 stores the authentication information in the external storage device 13.

The function parts of the arithmetic processing part 1 that are described above, namely, the basic control unit 101, the input receiving part 102, the output processing part 103, the authentication response part 104, the authentication information generating part 105, and the authentication information outputting part 106, are built by the CPU 21 by reading and executing a given program. The RAM 22 therefore stores a program for implementing processing procedures of the respective function parts.

The components described above are classified by the specifics of their main processing procedures for easier understanding of the configuration of the navigation device 100. Accordingly, the invention of this application is not limited by how components are classified or what the components are named. The configuration of the navigation device 100 may be classified into more components by the specifics of processing. The configuration of the navigation device 100 may also be classified so that one component executes more processing procedures.

The function parts may be built from hardware (an ASIC, a GPU, or the like). Processing procedures of the respective function parts may be executed by a single piece of hardware or a plurality of pieces of hardware.

As illustrated in FIG. 1, the mobile terminal 600 according to this embodiment includes a storage unit 610 for storing given information, a control unit 620, which includes an authentication response part 621 and a navigation part 622, and a transmitting/receiving part 630 for holding communication over the network 30 to and from other devices, in particular, the server device 500. The authentication response part 621 transmits, when a given processing request is to be issued to the server device 500 or when authentication information is requested by the server device 500, authentication information that proves the validity of the request. The navigation part 622 implements such functions as giving navigation on routes by displaying map information and other types of information.

The storage unit 610 is a data storage area which is constructed from a storage medium capable of at least read and write, such as an HDD or a non-volatile memory card.

The authentication response part 621 receives an authentication information presenting request. Receiving an authentication information presenting request, the authentication response part 621 obtains the authentication information 450 which has the configuration of FIG. 9 based on information for identifying the source of the authentication information presenting request, and outputs the authentication information 450 to the authentication request source. Specifically, authentication processing is executed when the authentication request source is the navigation part 622, which is an application program on the mobile terminal 600, in other words, when a navigation function inherent in the mobile terminal 600 is used instead of when carrying out communication to the server device 500 from the navigation device 100 for the navigation device 100, the authentication information 450 is not received from the navigation device 100, and the authentication response part 621 therefore generates the authentication information 450 and transmits the generated authentication information 450 to the server device 500.

When the authentication request source is the navigation part 622, which is an application program on the mobile terminal 600, the authentication response part 621 configures the authentication information 450 by using "SMT", which is an identifier for identifying the path of connection that is established by an application program on the mobile terminal 600, as information that indicates the day of the week out of the information stored as the time 453, in place of "Sun", "Mon", "Tue", "Wed", "Thu", "Fri", and "Sat".

When the authentication request source is a given request source such as a surrogate connection program on the mobile terminal 600 which carries out communication to the server device 500 from the navigation device 100 for the navigation device 100, the authentication response part 621 hands over the authentication information presenting request to the authentication response part 104 of the navigation device 100, and hands over the authentication information 450 received from the authentication information outputting part 106 to the surrogate connection program of the mobile terminal 600.

The navigation part 622 uses map information or the like stored in the storage unit 610 or other places to display map information, displays a screen for giving navigation on routes to a given destination, and performs route navigation processing which includes audio guidance, or other types of processing. The navigation part 622 is implemented by an application program on the mobile terminal 600. In the route navigation processing, when, for example, the map information needs to be updated, the navigation part 622 requests update information from the server device 500 and gives navigation on routes with the use of the downloaded update information. In order to prove that the mobile terminal 600 has a proper authorization to request the update information, the navigation part 622 uses the authentication response part 621 to transmit the authentication information 450 to the server device 500. The navigation part 622 also sends a response about whether or not the navigation function is in operation in response to a request from another control unit. Whether or not the navigation function is in operation means whether or not the obtainment of the current location and the displaying of a map are being performed. For example, when the mobile terminal 600 is simply carrying out communication from the navigation device 100 for the navigation device 100, the obtainment of the current location and the displaying of a map are not being performed and the navigation part 622 accordingly responds that the navigation function is not in operation.

The transmitting/receiving part 630 holds communication to and from other devices over the network 30. Specifically, the transmitting/receiving part 630 issues a request for map update information to the server device 500 or other devices, and receives the map update information from the server device 500.

The hardware configuration of the mobile terminal 600 is substantially the same as the hardware configuration example of the server device 500 which is illustrated in FIG. 4, and a description thereof is omitted.

The authentication response part 621 and the navigation part 622 in the control unit 620 of the mobile terminal 600 which are described above, or the processing part for carrying out the operation of connecting for the navigation device 100 and other processing parts, are built by the computing device by reading and executing a given program. The main storage device therefore stores a program for implementing processing procedures of the respective function parts.

The components of the mobile terminal 600 that are described above are classified by the specifics of their main processing procedures for easier understanding of the configuration of the mobile terminal 600. Accordingly, the invention of this application is not limited by how components are classified or what the components are named. The configuration of the mobile terminal 600 may be classified into more components by the specifics of processing. The configuration of the mobile terminal 600 may also be classified so that one component executes more processing procedures.

The control unit 620 of the mobile terminal 600 may be built from hardware (an ASIC, a GPU, or the like). Processing procedures of the respective function parts may be executed by a single piece of hardware or a plurality of pieces of hardware.

As illustrated in FIG. 1, the information processing terminal 700 according to this embodiment includes a storage unit 710 for storing given information, a control unit 720, which includes an authentication response part 721 and a map utilizing part 722, and a transmitting/receiving part 730 for holding communication over the network 30 to and from other devices, for example, the server device 500. The authentication response part 721 transmits, when a given processing request is issued to the server device 500 or when authentication information is requested by the server device 500, authentication information for proving the validity of the request. The map utilizing part 722 implements such functions as displaying map information or the like and creating travel route plan information.

The storage unit 710 is a data storage area which is constructed from a storage medium capable of at least read and write, such as an HDD or a non-volatile memory card.

The authentication response part 721 receives an authentication information presenting request. Receiving an authentication information presenting request, the authentication response part 721 obtains the authentication information 450 which has the configuration of FIG. 9 based on information for identifying the source of the authentication information presenting request, and outputs the authentication information 450 to the authentication request source. Specifically, when the authentication request source is the map utilizing part 722, which is an application program on the information processing terminal 700, the authentication response part 721 reads the authentication information 450 stored by the authentication information outputting part 106 of the navigation device 100 out of an external storage device (not shown), and transmits the read authentication information 450 to the server device 500.

In the case where the authentication information 450 cannot be obtained from the external storage device (not shown), the authentication response part 721 returns "authentication processing error", and outputs a request to connect to an external storage device that contains the authentication information 450.

The map utilizing part 722 uses map information or the like stored in the storage unit 710 or other places to display map information, displays a screen for planning a trip to a given destination or other screens, and, when receiving a change in plan, performs a route search or other types of processing as necessary. When a change in plan is received, the map utilizing part 722 issues a request for update information of map information, a request for information about a travel plan made by the user or others, or a request for other types of information to the server device 500. The map utilizing part 722 also creates, among others, travel information for handing over information of a plan made to the navigation device 100 which includes information of a found route, and stores the created information in an external storage device.

The map utilizing part 722 may be implemented by an application program on the information processing terminal 700, or by an application program that is downloaded from the server device 500 when executed. In the travel planning processing, when, for example, the map information needs to be updated, the map utilizing part 722 requests update information from the server device 500 and generates the travel information with the use of the downloaded update information. In order to prove that the information processing terminal 700 has a proper authorization to request the update information, the map utilizing part 722 uses the authentication response part 721 to transmit the authentication information 450 obtained from an external storage device to the server device 500.

The transmitting/receiving part 730 holds communication to and from other devices over the network 30. Specifically, the transmitting/receiving part 730 issues a request for map update information or travel plan information to the server device 500 or other devices, and receives the map update information or the travel plan information from the server device 500.

The hardware configuration of the information processing terminal 700 is substantially the same as the hardware configuration example of the server device 500 which is illustrated in FIG. 4, and a description thereof is omitted.

The authentication response part 721 and the map utilizing part 722 in the control unit 720 and other function parts of the information processing terminal 700 which are described above are built by the computing device by reading and executing a given program. The main storage device therefore stores a program for implementing processing procedures of the respective function parts.

The components of the information processing terminal 700 that are described above are classified by the specifics of their main processing procedures for easier understanding of the configuration of the information processing terminal 700. Accordingly, the invention of this application is not limited by how components are classified or what the components are named. The configuration of the information processing terminal 700 may be classified into more components by the specifics of processing. The configuration of the information processing terminal 700 may also be classified so that one component executes more processing procedures.

The control unit 720 of the information processing terminal 700 may be built from hardware (an ASIC, a GPU, or the like). Processing procedures of the respective function parts may be executed by a single piece of hardware or a plurality of pieces of hardware.

Figure 11:
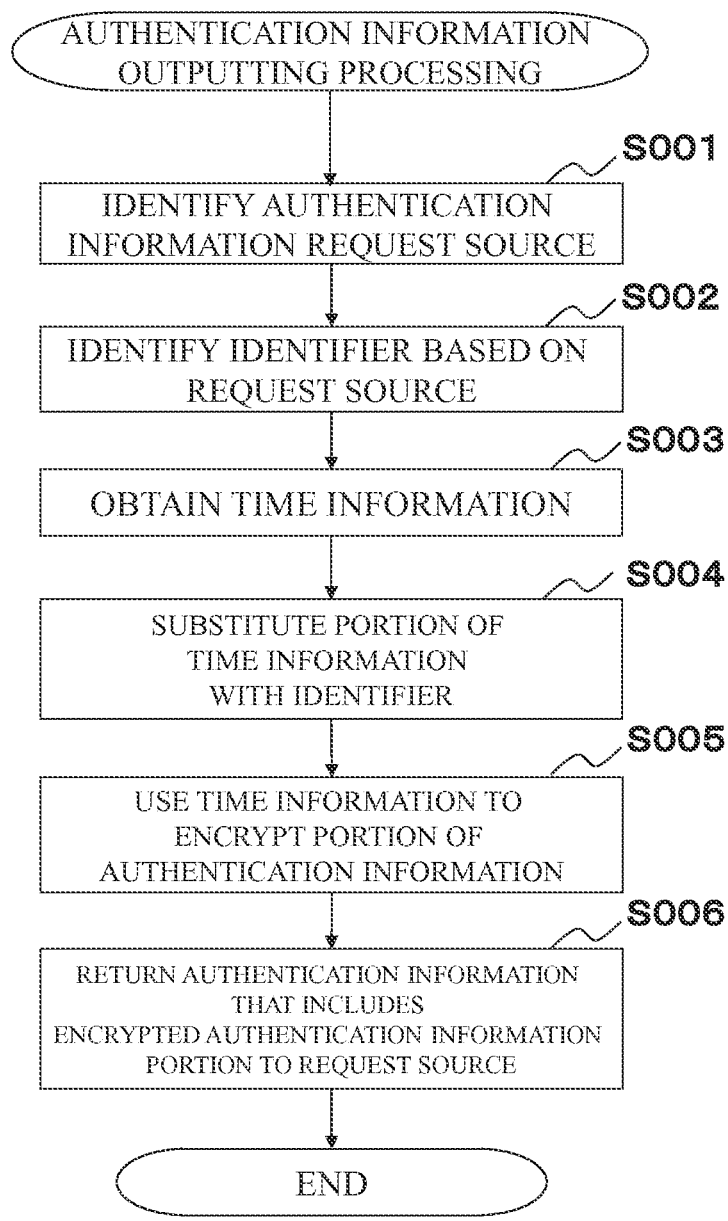
FIG. 11 is a flow chart of authentication information outputting processing.

[Description of Operation] The operation of the navigation device 100 to execute authentication information outputting processing is described next. FIG. 11 is a flow chart illustrating the authentication information outputting processing which is executed by the navigation device 100. The processing of this flow chart is executed when the authentication response part 104 receives a given authentication information request after the navigation device 100 is activated.

First, the authentication information generating part 105 identifies the source of the authentication information request (Step S001). Specifically, the authentication information generating part 105 refers to information for identifying a given request source that is included in the authentication information presenting request handed over from the authentication response part 104, for example, request source identifying information attached to the request, and then searches for and identifies the request source identifier 401 that matches the information indicating the authentication information request source.

The authentication information generating part 105 then identifies an identifier based on the authentication information request source (Step S002). Specifically, the authentication information generating part 105 reads the path display identifier 403 that is associated with the request source identifier 401 identified in Step S001.

The authentication information generating part 105 then issues a request for current time information to the basic control unit 101 to obtain the current time (Step S003). The authentication information generating part 105 obtains time information which includes, for example, a letter string in a format that reads as "Wed Jun 30 21:49:08 1993" or the like.

The authentication information generating part 105 then substitutes an identifier for a portion of the time information obtained in Step S003 (Step S004). Specifically, the authentication information generating part 105 substitutes "Wed" which is a letter string that identifies the day of the week out of the letter string of the time information obtained in Step S003 with information of the path display identifier 403 identified in Step S002. The letter string length of the information of the path display identifier 403 and the letter string length of the letter string that identifies the day of the week out of the letter string of the time information match, or the latter is longer than the former.

The authentication information generating part 105 next uses the time information to encrypt a portion of authentication information (Step S005). Specifically, the authentication information generating part 105 encrypts, with the use of a given algorithm, information that includes information of the terminal-specific password 303 by, for example, using as key information the time information a portion of which has been substituted in Step S004.

The authentication information generating part 105 then returns authentication information that includes the encrypted authentication information portion to the request source (Step S006). Specifically, the authentication information generating part 105 stores the information encrypted in Step S005 as the encrypted information 454 of the authentication information 450, stores the authentication version identifier 301 and terminal identifier 302 of the equipment information table 300 as the authentication version 451 and the terminal identifier 452, respectively, and stores the time information a portion of which has been substituted in Step S004 as the time 453, thereby generating the authentication information 450. The generated authentication information 450 is handed over to the authentication information outputting part 106. The authentication information outputting part 106 outputs the authentication information 450 to a destination that depends on the source of the authentication request. For example, when the authentication request source is an application program on the navigation device 100, the authentication information outputting part 106 transmits the authentication information 450 to the server device 500. When the authentication request source is a given request source such as a surrogate connection program of the mobile terminal 600 which carries out the operation of connecting to the server device 500 for the navigation device 100, the authentication information outputting part 106 hands over the authentication information to the surrogate connection program of the mobile terminal 600. When the authentication request source is an application program for the information processing terminal 700, the authentication information outputting part 106 stores the authentication information in the external storage device 13.

The processing flow of the authentication information outputting processing has now been described. Through the authentication information outputting processing, the authentication information 450 that includes an identifier varied depending on the authentication request source can be generated and output.

Figure 12:
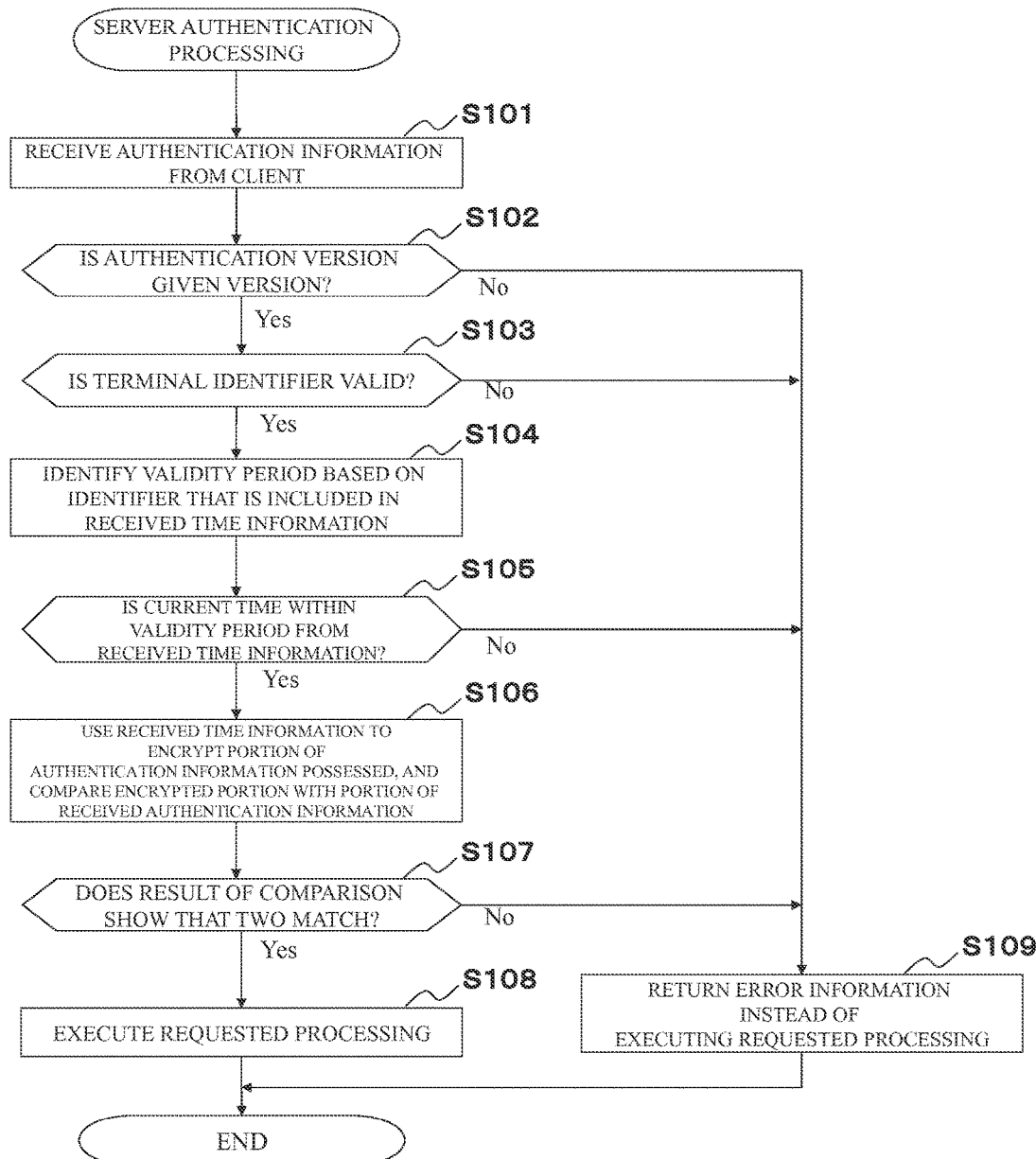
FIG. 12 is a flow chart of server authentication processing.

FIG. 12 is a flow chart illustrating server authentication processing which is executed by the server device 500. The processing of this flow chart is started when the information providing part 522 receives a given processing request that requires authentication.

First, the authentication processing part 521 receives the authentication information 450 from a client terminal (Step S101). Specifically, the authentication processing part 521 receives a cookie that includes the authentication information 450 transmitted, along with a processing request, from one of the navigation device 100, the mobile terminal 600, and the information processing terminal 700, which are client terminals.

The authentication processing part 521 then determines whether or not the authentication version is a given version (Step S102). Specifically, the authentication processing part 521 obtains the authentication version 451 from the authentication information 450 obtained in Step S101, and determines whether or not the obtained authentication version 451 is a given version. This is for determining whether the client terminal in question can be authenticated because authenticating a client terminal is not possible when the version information indicates a version older than the given version, for example. Accordingly, when the authentication version is not the given version, the authentication processing part 521 skips the control forward to Step S109, which is described later.

When the authentication version is the given version ("Yes" in Step S102), the authentication processing part 521 determines whether or not the terminal identifier is a valid identifier (Step S103). Specifically, the authentication processing part 521 obtains the terminal identifier 452 from the authentication information 450, and conducts a validity check on the obtained terminal identifier to check whether the terminal is a legitimately shipped product, whether a stolen property report or a service suspension request has been filed for the terminal, and the like. The validity check is conducted by referring to validity information (not shown) which is stored on the server device 500 or another device connected by a network. The validity information includes information for identifying the state of a terminal with respect to whether the terminal is a legitimately shipped product, whether a stolen property report or a service suspension request has been filed for the terminal, and the like. When the terminal identifier is not a valid identifier, the authentication processing part 521 skips the control forward to Step S109, which is described later.

When the terminal identifier is a valid identifier ("Yes" in Step S103), the authentication processing part 521 identifies a validity period based on an identifier that is included in the received time information (Step S104). Specifically, the authentication processing part 521 obtains information of the time 453 from the authentication information 450. The authentication processing part 521 then obtains, as a path display identifier, a portion of the information of the time 453 that indicates the day of the week, refers to the validity period information table 512 to identify the corresponding path display identifier 512A, and reads the authentication information validity period 512C that is associated with the identified path display identifier 512A.

The authentication processing part 521 next determines whether or not the current time is within a validity period from the received time information (Step S105). Specifically, the authentication processing part 521 identifies the current date/time kept on the server device 500 or obtained by NTP or the like, and determines whether or not a date/time that is identified from the time 453 included in the authentication information 450 is within a period that is calculated by counting the length of the authentication information validity period identified in Step S104 back from the current date/time. When the date/time of the time 453 is not within the calculated period, the authentication processing part 521 determines that the current time is not within the validity period, and skips the control forward to Step S109, which is described later.

When the current time is within the validity period from the received time information ("Yes" in Step S105), the authentication processing part 521 uses the received time information to encrypt a portion of authentication information that the authentication processing part 521 possesses, and compares the encrypted portion with a portion of the received authentication information (Step S106). Specifically, the authentication processing part 521 encrypts, with the use of a given algorithm such as the same algorithm that is used in the navigation device 600, information that includes information of the terminal-specific password 511B stored in the client information table 511 by using, as key information, the information of the time 453 obtained in Step S104, or by other methods. The authentication processing part 521 then compares the encrypted information with the encrypted information 454 included in the authentication information 450.

The authentication processing part 521 next determines whether or not the result of the comparison shows that the encrypted portion matches the encrypted information 454 (Step S107). Specifically, the authentication processing part 521 determines whether or not the data encrypted in Step S106 matches the encrypted information 454. When the encrypted data and the encrypted information 454 do not match, the authentication processing part 521 determines that the authentication is a failure, and skips the control forward to Step S109, which is described later.

When the encrypted portion matches the encrypted information 454 ("Yes" in Step S107), the authentication is determined as a success, and the information providing part 522 executes the requested processing (Step S108).

In Step S109 which is executed in the case of an authentication error, the authentication processing part 521 does not allow the information providing part 522 to execute the requested processing, and returns error information to the client device (Step S109).

The processing flow of the server authentication processing has now been described. Through the server authentication processing, the validity period of authentication information can be determined based on a path display identifier that is included in the authentication information. A person who uses authentication information that is generated prior to its validity period is thus prevented from being authenticated successfully.

This concludes the description on the first embodiment of the present invention. According to the first embodiment of the present invention, the risk of identity theft, tampering, and the like can be reduced properly while making full use of varied communication characteristics depending on which path (means) is used to connect to the server device. In short, the convenience is enhanced.

The present invention is not limited to the embodiment described above. Various modifications can be made to the first embodiment within the scope of the technical concept of the present invention. For instance, in the first embodiment, particularly for the mobile terminal 600, the specifics of the authentication information 450 transmitted vary from the case where the navigation part 622 inherent in the mobile terminal 600 issues a processing request to the server device 500 to the case of surrogate processing where the mobile terminal 600 carries out the issuing of a processing request to the server device 500 from the navigation device 100 connected to the mobile terminal 600 for the navigation device 100. In the case of surrogate processing where the mobile terminal 600 carries out the issuing of a processing request to the server device 500 from the navigation device 100 connected to the mobile terminal 600 for the navigation device 100, however, there is no distinction from the authentication information 450 that is transmitted when the navigation device 100 holds direct communication to the server device 500, despite the fact that it is the mobile terminal 600 that executes communication. To distinguish the authentication information 450 in the surrogate processing and the authentication information 450 in the direct communication from each other, the transmission of authentication information to the server device 500 may be executed in a mode that differentiates direct communication by the navigation device 100, communication for the surrogate processing (hereinafter referred to as online) executed by the mobile terminal 600, and communication for processing unique to the mobile terminal 600 (hereinafter referred to as offline) from one another.

The second embodiment is described below with reference to FIGS. 13 to 15.

The description of the second embodiment, which has basically the same configuration as that of the first embodiment, focuses on differences from the first embodiment.

FIG. 13 shows a validity period information table 512' which is stored in the storage device 3 by the server device 500 according to the second embodiment. The validity period information table 512' is basically the same as the validity period information table 512 according to the first embodiment. In the validity period information table 512', however, online/offline 512D which is information for distinguishing online and offline from each other is provided for each path 512B, and the authentication information validity period 512C is stored in association with each combination of the path 512B and online/offline 512D. This means that different validity periods are set for the same path in order to distinguish the case of online and the case of offline from each other.

FIG. 14 is a diagram illustrating the processing flow of authentication information outputting processing (mobile) according to the second embodiment.

First, the authentication response part 621 identifies the source of an authentication information request (Step S201). Specifically, the authentication response part 621 refers to information for identifying a given request source that is included in the received authentication information presenting request, for example, request source identifying information attached to the request, and then searches for and identifies the request source identifier 401 that matches the information indicating the authentication information request source.

The authentication response part 621 then identifies an identifier based on the authentication information request source (Step S202). Specifically, the authentication response part 621 reads the path display identifier 403 that is associated with the request source identifier 401 identified in Step S201.

The authentication response part 621 then determines whether or not the mobile terminal 600 is separated from the navigation device 100 (Step S203). Specifically, the authentication response part 621 makes an inquiry to the surrogate connection program about whether or not communication has started in response to a connection request from the navigation device 100 to determine that the mobile terminal 600 is not separated in the case where the communication has started, and determine that the mobile terminal 600 is separated in the case where the communication has ended.

In the case where the mobile terminal 600 is not separated from the navigation device 100 ("No" in Step S203), the authentication response part 621 transmits an authentication information request to the navigation device 100 (Step S204).

The authentication response part 621 then receives authentication information from the navigation device 100, and saves the authentication information in a cache (Step S205). Specifically, the authentication response part 621 receives the authentication information 450 transmitted from the navigation device 100 to which the authentication information request is transmitted in Step S204, and stores the received authentication information 450 in a given cache area of the storage unit 610 as cache information.

The authentication response part 621 then attaches an online flag to the authentication information 450 and then returns the authentication information 450 to the request source (Step S206). Specifically, the authentication response part 621 transmits the authentication information 450 received in Step S205 to the authentication information request source after adding information such as a flag that indicates that connection to the navigation device 100 is online to a parameter or the like of the authentication information 450.

The authentication response part 621 then ends the authentication information outputting processing.

In the case where the mobile terminal 600 is separated from the navigation device 100 ("Yes" in Step S203), the authentication response part 621 determines whether or not navigation processing of the mobile terminal 600 is out of operation (Step S207). Specifically, the authentication response part 621 transmits information that is an inquiry about whether or not the navigation processing is in operation to the navigation part 622, and determines whether or not the navigation processing is out of operation based on a response to the inquiry.

In the case where the navigation processing is out of operation ("Yes" in Step S207), the authentication response part 621 checks whether there is authentication information that has been received from the navigation device 100 and cached and, if there is, attaches an offline flag to the authentication information to return the authentication information to the request source (Step S208). Specifically, the authentication response part 621 transmits the authentication information 450 cached in Step S205 to the authentication information request source after adding information such as a flag that indicates that connection to the navigation device 100 is offline to a parameter or the like of the authentication information 450.

The authentication response part 621 then ends the authentication information outputting processing.

In the case where the navigation processing is not out of operation ("No" in Step S207), the authentication response part 621 issues a request for information of the current time to an operating system (OS, not shown) or others to obtain the current time (Step S209). The authentication response part 621 obtains time information that includes, for example, a letter string in a format that reads as "Wed Jun 30 21:49:08 1993" or the like.

The authentication response part 621 substitutes an identifier for a portion of the obtained time information (Step S210). Specifically, the authentication response part 621 substitutes a letter string that identifies the day of the week out of the letter string of the time information obtained in Step S209, for example, "Wed" which corresponds to the top three digits, with information of the path display identifier 403 identified in Step S202. The letter string length of the information of the path display identifier 403 and the letter string length of the letter string that identifies the day of the week out of the letter string of the time information match, or the latter is longer than the former.

The authentication response part 621 next uses the time information to encrypt a portion of authentication information (Step S211). Specifically, the authentication response part 621 encrypts, with the use of a given algorithm, such as the same algorithm that is used in the navigation device 100 for encryption, information that includes information of the terminal-specific password 303 assigned in advance to the navigation part 622 of the mobile terminal 600 by using, as key information, the time information a portion of which has been substituted in Step S211, or by other methods.

The authentication response part 621 attaches the online flag to authentication information that includes the encrypted authentication information portion, and then returns the authentication information to the request source (Step S212). Specifically, the authentication response part 621 stores the information encrypted in Step S211 as the encrypted information 454 of the authentication information 450, stores the authentication version identifier 301 and terminal identifier 302 of the equipment information table 300 as the authentication version 451 and the terminal identifier 452, respectively, stores the time information a portion of which has been substituted in Step S210 as the time 453, and attaches information such as a flag that indicates that connection to the navigation device 100 is offline, thereby generating the authentication information 450. The generated authentication information 450 is output to the authentication request source.

The authentication response part 621 then ends the authentication information outputting processing.

The processing flow of the authentication information outputting processing (mobile) has now been described. Through the authentication information outputting processing (mobile), the authentication information 450 that includes an identifier varied depending on the authentication request source can be generated and output. Further, information for identifying whether connection to the navigation device 100 is online or offline can be attached to the authentication information 450 to be output, depending on the type of the connection which includes surrogate connection where the mobile terminal 600 carries out the operation of connecting for the navigation device 100, regardless of whether the mobile terminal 600 is connected to the navigation device 100 or not.

Figure 15:
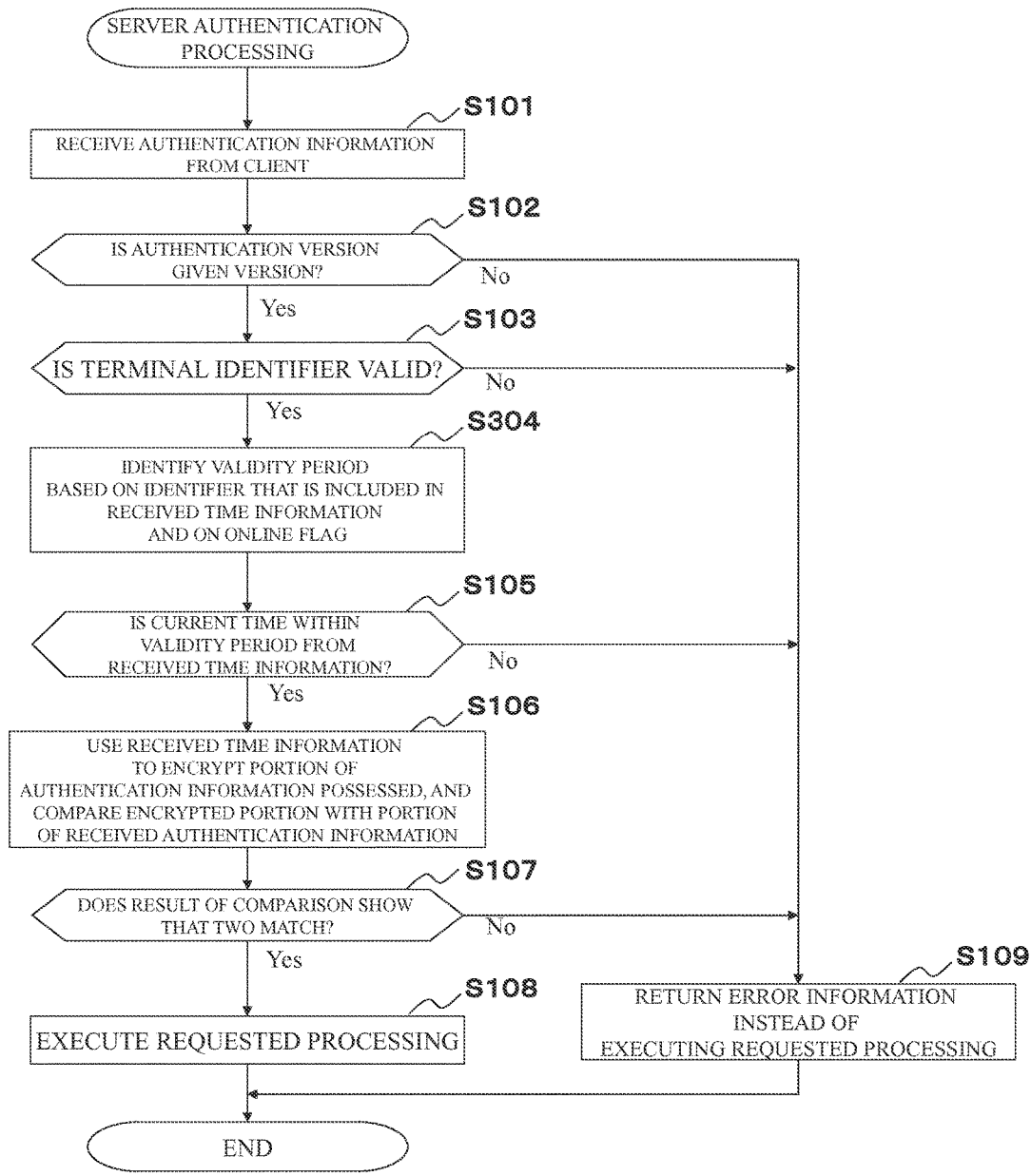
FIG. 15 is a flow chart of server authentication processing according to the second embodiment of the present invention.

FIG. 15 is a flowchart illustrating the processing flow of server authentication processing according to the second embodiment. This server authentication processing is basically the same as the server authentication processing in the first embodiment, except Step S104. The difference is described below.

When the terminal identifier is valid in Step S103 ("Yes" in Step S103), the authentication processing part 521 identifies a validity period based on an identifier that is included in the received time information and the online flag (Step S304). Specifically, the authentication processing part 521 refers to the validity period information table 512' to identify the authentication information validity period 512C that is associated with the relevant combination of the path display identifier 512A and online/offline 512D, which is a flag indicating one of online and offline.

The processing flow of the server authentication processing according to the second embodiment has now been described. Through this processing, an appropriate authentication information validity period can be set by determining whether communication to the navigation device is online or offline based not only on the connecting path but also on information of the online/offline flag that is included in the authentication information.

In the authentication processing according to the second embodiment, information of the online/offline flag may be included as an independent parameter in the authentication information 450, or may be a substitute for a portion of the path display identifier. In an example of the case where information of the online/offline flag is included as an independent parameter in the authentication information 450, information of the online/offline flag may be handled as a parameter "ACCESS=ONLINE" or "ACCESS=OFFLINE" of a cookie attached to the authentication information 450, or may be handled as a parameter "ACCESS=ONLINE" or "ACCESS=OFFLINE" of an HTTP(S) request (POST or GET). In an example of the case where information of the online/offline flag is a substitute for a portion of the path display identifier, the last digit out of three digits that constitute the path display identifier may be substituted with fixed information such as "X" when the connection is offline. The server device 500 in this case determines whether the connection is online or offline based on the last digit of the path display identifier.

While a portion of the time information is substituted with a path display identifier in the first embodiment and the second embodiment, the present invention is not limited thereto and, for example, information corresponding to a path display identifier may be handed over in an independent parameter. For instance, "ROUTE" may be set as a parameter, instead of changing the time information, so that a path display identifier ("MEM", "SMT", or the like, or information for identifying a path such as "1" or "2") is included in the value of the parameter.

In this way, in an environment where the invention of this application is mixed with an existing authentication method, authentication information that is used in the existing authentication method needs to be changed only partially, and an authentication method according to the invention of this application can be introduced easily without changing the communication volume and security policies.

The present invention has been described mainly through embodiments. While the embodiments described above deal with an example of applying the present invention to a navigation device, the present invention is not limited to navigation devices and is applicable to all kinds of devices that give navigation on routes for a mobile object, for example, vehicle-mounted devices, cellular phones, personal digital assistants (PDAs), mobile PCs, music players, and all other types of information terminals.

REFERENCE SIGNS LIST

1 . . . arithmetic processing part, 2 . . . display, 3 . . . storage device, 4 . . . audio input/output device, 5 . . . input device, 6 . . . ROM device, 7 . . . vehicle speed sensor, 8 . . . gyro sensor, 9 . . . GPS signal receiver, 10 . . . FM multiplex broadcast receiver, 11 . . . beacon receiver, 12 . . . communication device, 13 . . . external storage device, 21 . . . CPU, 22 . . . RAM, 23 . . . ROM, 24 . . . I/F, 25 . . . bus, 41 . . . microphone, 42 . . . speaker, 51 . . . touch panel, 52 . . . dial switch, 100 . . . navigation device, 101 . . . basic control unit, 102 . . . input receiving part, 103 . . . output processing part, 104 . . . authentication response part, 105 . . . authentication information generating part, 106 . . . authentication information outputting part, 200 . . . link table, 300 . . . equipment information table, 400 . . . path identification information table, 450 . . . authentication information, 500 . . . server device, 510 . . .

storage unit, 511 . . . client information table, 512 . . . validity period information table, 520 . . . control unit, 521 . . . authentication processing part, 522 . . . information providing part, 530 . . . transmitting/receiving part, 600 . . . mobile terminal, 610 . . . storage unit, 620 . . . control unit, 621 . . . authentication response part, 622 . . . navigation part, 630 . . . transmitting/receiving part, 700 . . . information processing terminal, 710 . . . storage unit, 720 . . . control unit, 721 . . . authentication response part, 722 . . . map utilizing part, 730 . . . transmitting/receiving part

The invention claimed is:

1. A device, comprising:
equipment information creating request receiving means for receiving an equipment information creating request issued by external equipment;
date/time obtaining means for obtaining information for identifying a date/time;
identification means for identifying, from the equipment information creating request, a request source identifier that is associated with a request source of the equipment information creating request received by the equipment information creating request receiving means, for identifying a path display identifier that is associated with the request source identifier, for identifying a validity period based on the path display identifier, and for indicating a connection path between the device and the request source; and
output means for outputting, to the external equipment, in response to the equipment information creating request, at least the request source identifier and the path display identifier identified by the identification means and the information for identifying a date/time;
wherein the validity period varies depending upon the connection path.

2. A device according to claim 1, further comprising surrogate communication means for carrying out communication to and from the external equipment for another device,
wherein, in the communication handled by the surrogate communication means, the output means are further adapted to output, to the external equipment, information for identifying a state of connection to the another device for which the surrogate communication means handles the communication to and from the external equipment.

3. A device, comprising:
communication means for holding communication to and from external equipment;
storage means for storing a request source identifier determined based on a type of the external equipment in association with a path display identifier indicating a connection path between the device and the request source and with a validity period based on the request source identifier;
authentication information receiving means for receiving, via the communication means, from the external equipment, authentication information which includes a request source identifier, the path display identifier and date/time information; and
validity period determining means for obtaining the path display identifier and for identifying the validity period in the storage means that is associated with the request source identifier and the path display identifier obtained from the authentication information that is received by the authentication information receiving means, and, when the date/time information indicates a date/time outside the identified validity period, for determining that the authentication information is invalid;
wherein the validity period varies depending upon the connection path.

4. A device according to claim 3, wherein the validity period determining means is adapted to obtain, as the request source identifier, a given portion of the date/time information.

5. A device according to claim 3, wherein the validity period determining means is adapted to obtain, as the request source identifier, a portion of the date/time information that indicates a day of a week.

6. A device according to claim 3, wherein the authentication information receiving means is adapted to receive the authentication information from cookie data.

7. A device according to claim 4, wherein the validity period determining means is adapted to obtain, as the request source identifier, a portion of the date/time information that indicates a day of a week.

8. A device according to claim 4, wherein the authentication information receiving means is adapted to receive the authentication information from cookie data.

9. A device according to claim 5, wherein the authentication information receiving means is adapted to receive the authentication information from cookie data.

10. A non-transitory computer readable medium programmed with a program for causing a computer to execute authentication procedures, the program causing the computer to function as a control means, and the program causing the control means to execute:
an equipment information creating request receiving procedure of receiving an equipment information creating request which is issued by external equipment;
a date/time obtaining procedure of obtaining information for identifying a date/time;
an identification procedure of identifying, from the equipment information creating request, a request source identifier that is associated with a request source of the equipment information creating request received in the equipment information creating request receiving procedure, of identifying a path display identifier that is associated with the request source identifier, of identifying a validity period based on the path display identifier, and of indicating a connection path between the device and the request source; and
an output procedure of outputting, to the external equipment, in response to the equipment information creating request, at least the request source identifier and the path display identifier identified in the identification procedure and the information for identifying a date/time;
wherein the validity period varies depending upon the connection path.

11. A non-transitory computer readable medium programmed with a program for causing a computer to execute authentication procedures, the program causing the computer to function as control means, communication means for holding communication to and from external equipment, and storage means for storing a request source identifier determined based on a type of the external equipment in association with a path display identifier indicating a connection path between the device and the request source and with a validity period based on the request source identifier, the program causing the control means to execute:
an authentication information receiving procedure of receiving, via the communication means, from the external equipment, authentication information which includes a request source identifier, the path display identifier, and date/time information; and a validity period determining procedure of obtaining the path display identifier and of identifying the validity period in the storage means that is associated with the request source identifier and the path display identifier obtained from the authentication information that is received in the authentication information receiving procedure, and, when the date/time information indicates a date/time outside the identified validity period, determining that the authentication information is invalid;

wherein the validity period varies depending upon the connection path.

* * * * *